United States Patent
Wang et al.

(10) Patent No.: US 11,182,596 B2
(45) Date of Patent: Nov. 23, 2021

(54) IDENTIFYING A DEFICIENCY OF A FACILITY

(71) Applicant: INTERNATIONAL BUSINESS MACHINES CORPORATION, Armonk, NY (US)

(72) Inventors: Wen Wang, Beijing (CN); Yan Bin Fu, Ningbo (CN); Yi Wu, Ningbo (CN); Qing Jun Gao, Beijing (CN); Shuang Yin Liu, Beijing (CN); Raymond Lee Man Kong, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

(21) Appl. No.: 16/183,993

(22) Filed: Nov. 8, 2018

(65) Prior Publication Data
US 2020/0151440 A1    May 14, 2020

(51) Int. Cl.
*G06K 9/00* (2006.01)
*G06N 5/04* (2006.01)
*G06K 9/62* (2006.01)
*G06N 20/00* (2019.01)

(52) U.S. Cl.
CPC ....... *G06K 9/00335* (2013.01); *G06K 9/6262* (2013.01); *G06N 5/048* (2013.01); *G06K 9/00778* (2013.01); *G06K 9/00785* (2013.01); *G06N 20/00* (2019.01)

(58) Field of Classification Search
CPC ............. G06K 9/00335; G06K 9/6262; G06K 9/00778; G06K 9/00785; G06N 5/048; G06N 20/00
See application file for complete search history.

(56) References Cited

U.S. PATENT DOCUMENTS

| | | |
|---|---|---|
| 8,195,598 B2 | 6/2012 | Hua et al. |
| 9,183,512 B2 | 11/2015 | Lehmann et al. |
| 9,355,306 B2 | 5/2016 | Wu et al. |

(Continued)

FOREIGN PATENT DOCUMENTS

| | | | | |
|---|---|---|---|---|
| CN | 105956568 A | * | 9/2016 | ............... G06K 9/00 |
| CN | 107408225 B | * | 1/2020 | .......... G06F 11/2007 |

OTHER PUBLICATIONS

De Melo Borges et al. "Urban anomaly detection: a use-case for participatory infra-structure monitoring", https://dl.acm.org/citation.cfm?id=2962757, Proceedings of the Second International Conference on IoT in Urban Space, pp. 36-38, Tokyo, Japan, May 24-25, 2016, 1 page.

(Continued)

*Primary Examiner* — Zhitong Chen
(74) *Attorney, Agent, or Firm* — Scott Dobson; Andrew D. Wright; Roberts Calderon Safran & Cole, P.C.

(57) ABSTRACT

A computer-implemented method comprising: monitoring, by a computing device, live sensor data received from one or more sensor devices; detecting, by the computing device, abnormal behavior of one or more individuals or objects based on the monitoring the live sensor data; determining, by the computing device, a deficiency of a facility based on the detecting the abnormal behavior; and executing, by the computing device, a computer-based instruction based on the deficiency of the facility.

20 Claims, 7 Drawing Sheets

(56) References Cited

U.S. PATENT DOCUMENTS

| | | |
|---|---|---|
| 2008/0031491 A1 | 2/2008 | Ma et al. |
| 2012/0134532 A1* | 5/2012 | Ni .................. G06K 9/00785 |
| | | 382/103 |
| 2018/0122227 A1* | 5/2018 | Mubarek ............... G08B 21/18 |
| 2018/0151045 A1* | 5/2018 | Kim ..................... B64C 39/024 |

OTHER PUBLICATIONS

Zhang et al., "Detecting urban anomalies using multiple spatio-temporal data sources", https://dl.acm.org/citation.cfm?id=3191786, Proceedings of the ACM on Interactive, Mobile, Wearable and Ubiquitous Technologies, vol. 2 Issue 1, Article No. 54, Mar. 2018, 1 page.

Popoola et al., "Video-Based Abnormal Human Behavior Recognition—A Review", https://ieeexplore.ieee.org/abstract/document/6129539/, IEEE Transactions on Systems, Man, and Cybernetics, Part C (Applications and Reviews), vol. 42, Issue: 6, Nov. 2012, 3 pages.

Candamo et al., "Understanding transit scenes: a survey on human behavior-recognition algorithms", https://ieeexplore.ieee.org/abstract/document/5276836/, IEEE Transactions on Intelligent Transportation Systems, vol. 11, Issue: 1, Mar. 2010, 3 pages.

Mell et al., "The NIST Definition of Cloud Computing", NIST, Special Publication 800-145, Sep. 2011, 7 pages.

\* cited by examiner

US 11,182,596 B2

IDENTIFYING A DEFICIENCY OF A FACILITY

BACKGROUND

The present invention generally relates to identifying a deficiency of a facility and, more particularly, to identifying a deficiency of a facility based on analysis of user behavior and movements.

Repair and maintenance of facilities ensures public safety and optimal pedestrian and/or vehicle traffic flow. That is, for safe pedestrian and vehicle travel in a public setting (e.g., urban, suburban, or rural area), individuals rely on operable, intact, and working facilities (e.g., crosswalks, pedestrian crossings/zebra crossings, traffic lights, manhole covers, stages, bus stations, sidewalks, roads, stairs, etc.).

SUMMARY

In an aspect of the invention, a computer-implemented method includes: monitoring, by a computing device, live sensor data received from one or more sensor devices; detecting, by the computing device, abnormal behavior of one or more individuals or objects based on the monitoring the live sensor data; determining, by the computing device, a deficiency of a facility based on the detecting the abnormal behavior; and executing, by the computing device, a computer-based instruction based on the deficiency of the facility.

In an aspect of the invention, there is a computer program product comprising a computer readable storage medium having program instructions embodied therewith. The program instructions executable by a computing device to cause the computing device to: monitor live video data of a plurality of individuals traversing a public facility; detect abnormal behavior of the plurality of individuals based on the monitoring the live video data; determine a deficiency of a facility based on the detecting the abnormal behavior; and perform a mitigating action based on the deficiency of the facility.

In an aspect of the invention, a system includes: a processor, a computer readable memory and a computer readable storage medium associated with a computing device; program instructions to detect a real-time behavior of a plurality of individuals from monitoring video data in real-time; program instructions to detect that the real-time behavior of the plurality of individuals at a particular location of a facility deviates is from training data defining normal behavior; program instructions to determine that the real-time behavior is abnormal based on the detecting that the real-time behavior deviates from the training data; program instructions to determine a deficiency of the facility at the particular location based on determining that the real-time behavior is abnormal; and program instructions to execute a computer-based instruction based on the determining the deficiency. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
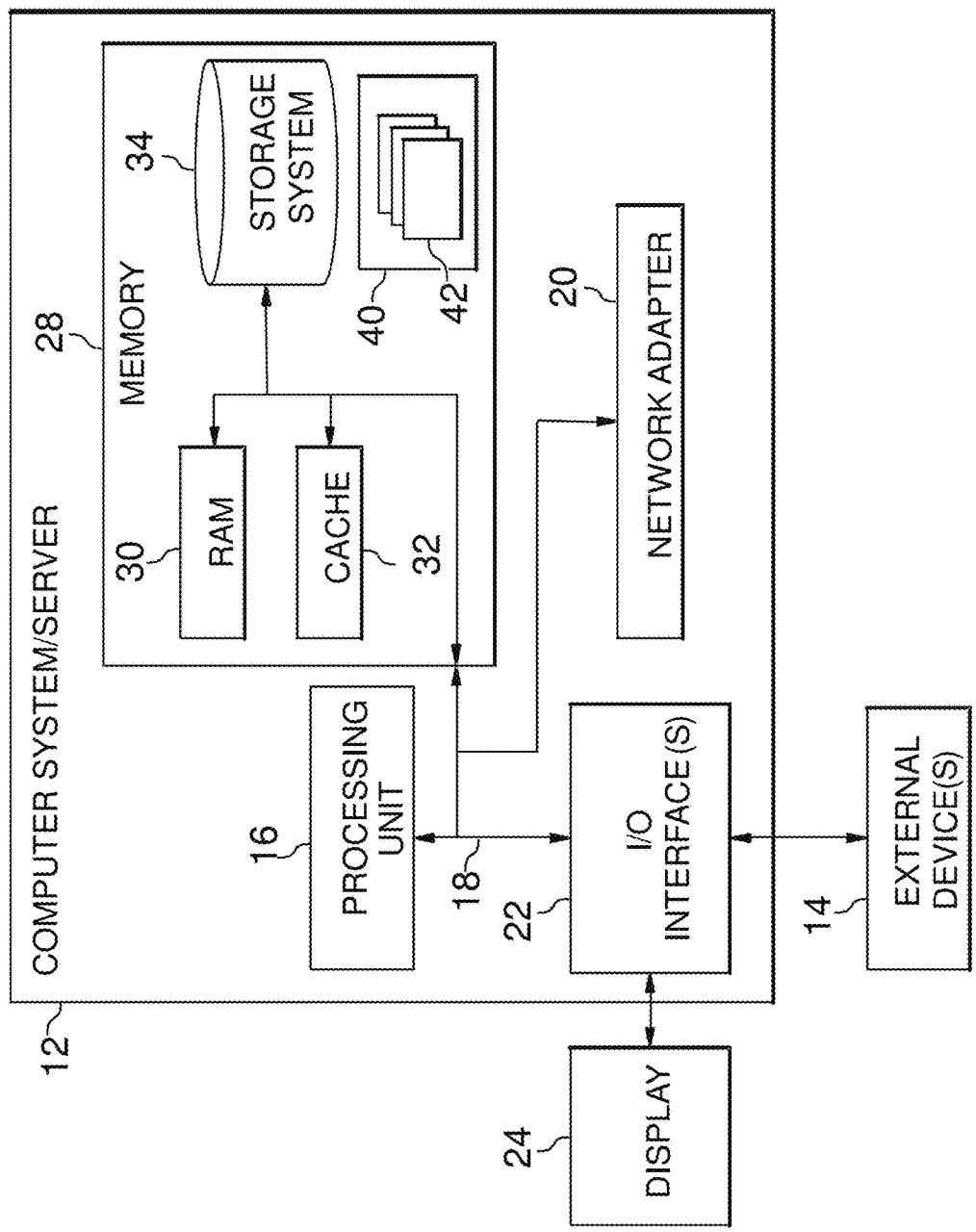
FIG. 1 depicts a cloud computing node according to an embodiment of the present invention.

The present invention generally relates to identifying a deficiency of a facility and, more particularly, to identifying a deficiency of a facility based on analysis of user behavior and movements. A facility, as described herein, includes crosswalks (e.g., pedestrian crossings/zebra crossings), traffic lights, roadways, manhole covers, stages, bus stations, sidewalks, staircases, etc. (e.g., located in an urban, suburban, or rural area). For safe pedestrian and vehicle travel in a public setting (e.g., urban, suburban, or rural area), individuals rely on operable, intact, and working facilities. Accordingly, aspects of the present invention monitor user behavior and movements using cameras and/or sensors (e.g., traffic cameras, street-side cameras/sensors, etc.) and determine when a facility is deficient when the behavior/moments of individuals traversing through or over a facility deviates from what is considered "normal movements."

As an illustrative, non-limiting example, aspects of the present invention detect when individuals walking on a sidewalk are walking straight at a consistent speed, but suddenly slow down and walk in a roundabout manner, thus indicating an obstacle in the sidewalk (e.g., blockage, pothole, displaced manhole cover, etc.). As another illustrative, non-limiting example, aspects of the present invention detect when the average movement speed of individuals is higher at one zebra crossing than at another, indicating that the traffic light interval for allowing pedestrian crossing is too short. In embodiments, aspects of the present invention detect a deficient facility based on monitoring the movements of vehicles in addition to individuals. As an illustrative example, a pothole or displaced manhole cover in a road can be detected based on abnormal vehicle behavior surrounding the pot hole or displaced manhole cover (e.g., sudden vehicle swerves to avoid the pothole, vehicle vertical displacement from driving over a pot hole or displaced manhole cover, etc.).

As described herein, aspects of the present invention determine different types of facility deficiencies. For example, aspects of the present invention determine that the deficiency is related to a design flaw in the facility (e.g., the design of the facility is not reasonable or convenient). Additionally, or alternatively, aspects of the present invention determine that the design of the facility is not accommodating to specific types of crowds having specific requirements. Additionally, or alternatively, aspects of the present invention determine that a facility is aging or broken.

In embodiments, aspects of the present invention detect the presence of deficiencies in facilities in an automated manner, thus identifying the deficiencies relatively quickly. For example, it is not feasible to station a human inspector at each urban facility, or each section of road/sidewalk, etc. Accordingly, aspects of the present invention leverage the use of sensors for early detection of facility deficiency without the need for human inspectors, thus improving the response time for detecting and repairing facilities. In turn, public safety and vehicle/pedestrian traffic flow is improved.

As described herein, aspects of the present invention analyze user behavior/movement data related to urban facilities by monitoring video and/or other sensor data in real time. Further, aspects of the present invention automatically identify the deficiency of urban facilities by analyzing unusual user behavior by monitoring video and/or sensor data. In embodiments, aspects of the present invention pre-locate the reason of facility deficiency based on a differences analysis (e.g., an analysis of the deviation between "normal" user movements and "abnormal" user movements).

In embodiments, aspects of the present invention perform a corrective action or mitigating action based on detecting a deficiency in a facility. For example, aspects of the present invention generate a report of the deficiency to relevant officials responsible for maintaining and/or repairing the facilities. Additionally, or alternatively, aspects of the present invention control the operations of the facility based on the deficiency (e.g., by adjusting the operations of a traffic light to give an additional amount of time to pedestrians to cross a crosswalk). Additionally, or alternatively, aspects of the present invention provide alerts regarding the deficiency to nearby individuals via their user devices (e.g., to warn the individuals of the deficiency, such as a pothole or other potential tripping hazard). Additionally, or alternatively, aspects of the present invention control the operations of an electronic billboard by posting warnings about the deficiency on the electronic billboard (e.g., to warn surrounding individuals of the deficiency).

As described herein, aspects of the present invention detect discrepant behavior by monitoring sensor/video data to discover unusual behaviors of a single entity (e.g. a person, a car, etc.) within a time period. Additionally, or alternatively, aspects of the present invention discover a group of individuals within a crowd with abnormal behaviors at a specific point in time. For example, the micro expressions, biometrics data, breathing patterns, heartrate date, mood data, etc., of a single individual or group of individuals can be used to detect discrepant behavior (e.g., an individual suddenly turning sharply to avoid an obstacle, pothole, and/or other hazard).

In embodiments, aspects of the present invention discover the dimensions that are associated with abnormal behaviors, including, for example, space, time, weather, climate, special needs factors, etc. For example, an abnormal behavior includes a determination that the overall moving speed of an individual crossing the road is faster than others, or that a crowd of individuals turned suddenly when moving forward (e.g., changes related with spatial dimension). Additionally, or alternatively, user feedback information is used to determine deficiency in a facility, as well as the attributes of the individuals that gave the feedback. For example, a first group of individuals that gave negative feedbacks after crossing a zebra crosswalk indicates that the crosswalk is unaccommodating to the first group of individuals.

In embodiments, aspects of the present invention compare facilities in different spatial/time/crowd dimensions, to perform a quality evaluation, differences comparison, and rationality analysis. These processes can be performed with video and image recognition and differences analysis technology which is based on machine learning technology. In embodiments, aspects of the present invention automatically discover and report the deficiency of urban facilities to relevant officials once detected, or perform another action based on the detection of a deficiency.

In embodiments, aspects of the present invention provide a particular solution to a particular problem through the use of rules. For example, aspects of the present invention provide a solution to the problem of timely facility maintenance and repair based on rules that indicate when a facility is deficient. Further, aspects of the present invention provide a particular method of using raw data from a configuration of sensors in order to provide a technical solution to the field of facility maintenance and repair. Moreover, aspects of the present invention improve the functioning of computing systems and computing devices in a way such that the computer systems and computing devices perform functions that were not previously performed.

To the extent the aforementioned implementations collect, store, and/or employ personal information provided by individuals (e.g., biometrics data, location data, etc.), it should be understood that such information shall be used in accordance with all applicable laws concerning protection of personal information. Additionally, the collection, storage, and use of such information is subject to consent of the individual to such activity, for example, through "opt-in" or "opt-out" processes as is appropriate for the situation and type of information. Storage and use of personal information is conducted in an appropriately secure manner reflective of the type of information, for example, through various encryption and anonymization techniques for particularly sensitive information. Further, an "opt-in" process is employed for providing users with alerts in accordance with aspects of the present invention, and at any time, each user may "opt-out" of receiving future alerts.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
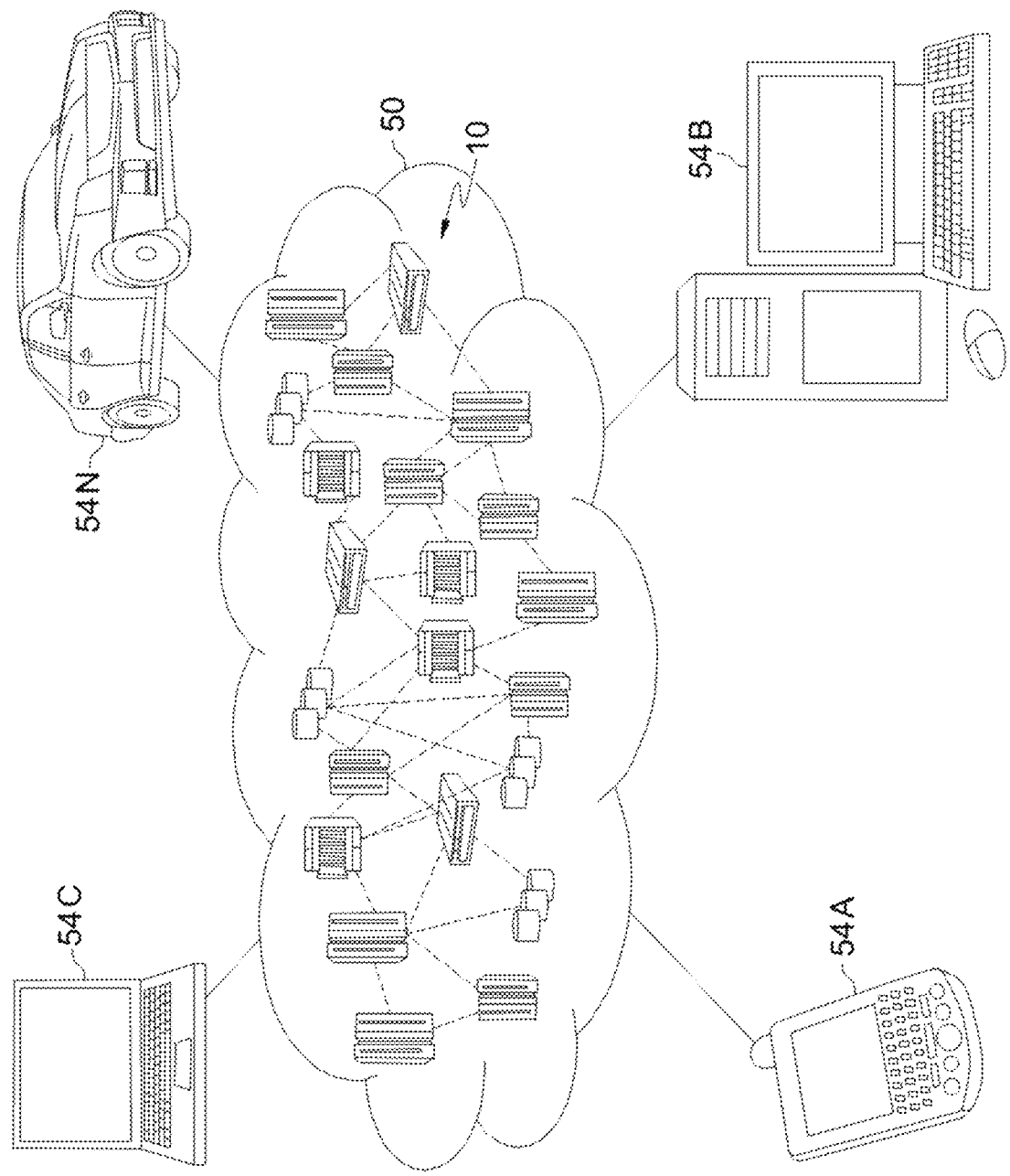
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
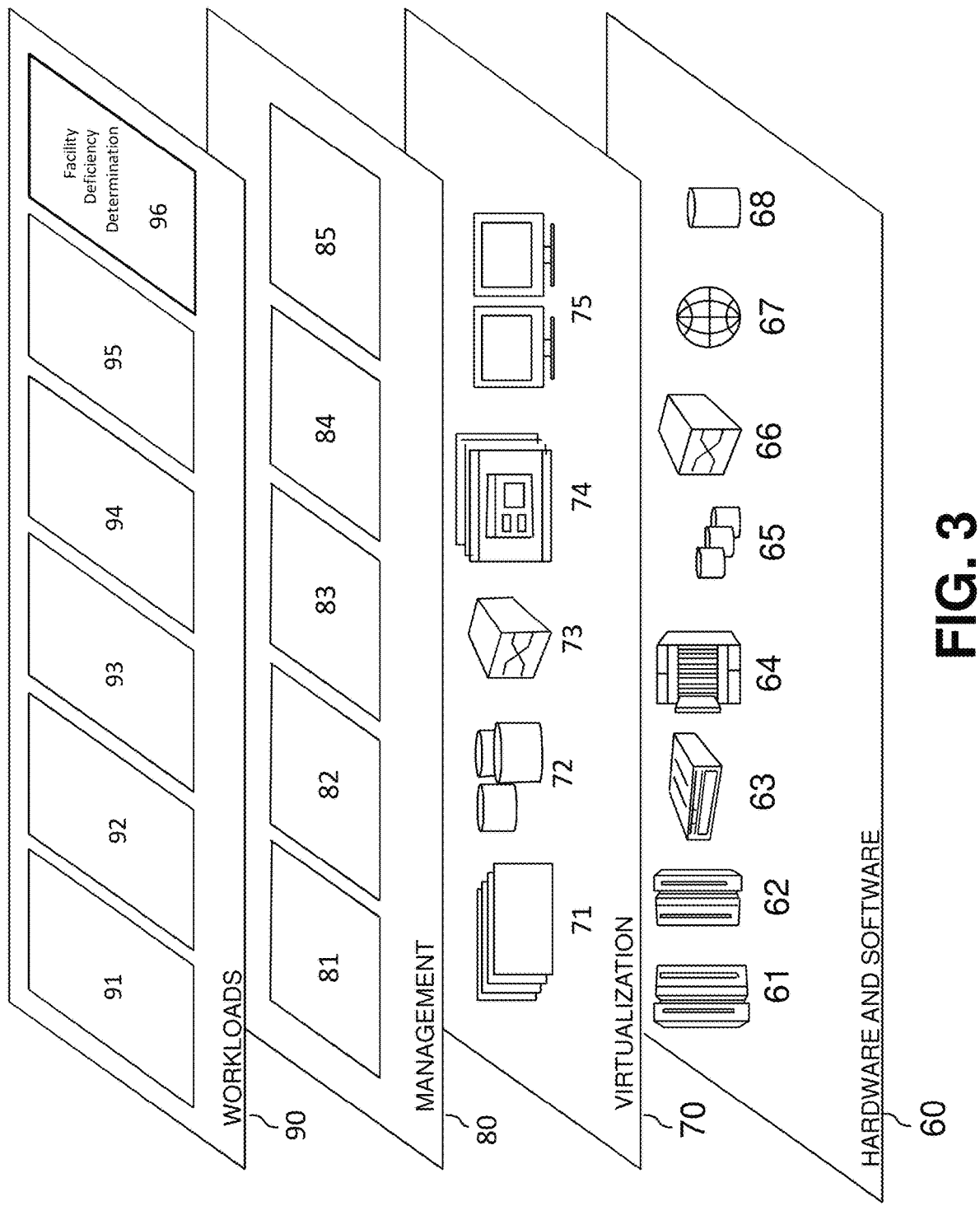
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and facility deficiency determination 96.

Referring back to FIG. 1, the program/utility 40 may include one or more program modules 42 that generally carry out the functions and/or methodologies of embodiments of the invention as described herein (e.g., such as the functionality provided by facility deficiency determination 96). Specifically, the program modules 42 may monitor live sensor data for abnormal behavior in the context of facility deficiency determination, detect abnormal behavior based on comparing behavior from live sensor data to training data, determine details of abnormal behavior, determine deficiency in facility, and execute a computer-based instruction based on the facility deficiency. Other functionalities of the program modules 42 are described further herein such that the program modules 42 are not limited to the functions described above. Moreover, it is noted that some of the modules 42 can be implemented within the infrastructure shown in FIGS. 1-3. For example, the modules 42 may be representative of a facility deficiency server as shown in FIG. 4.

Figure 4:
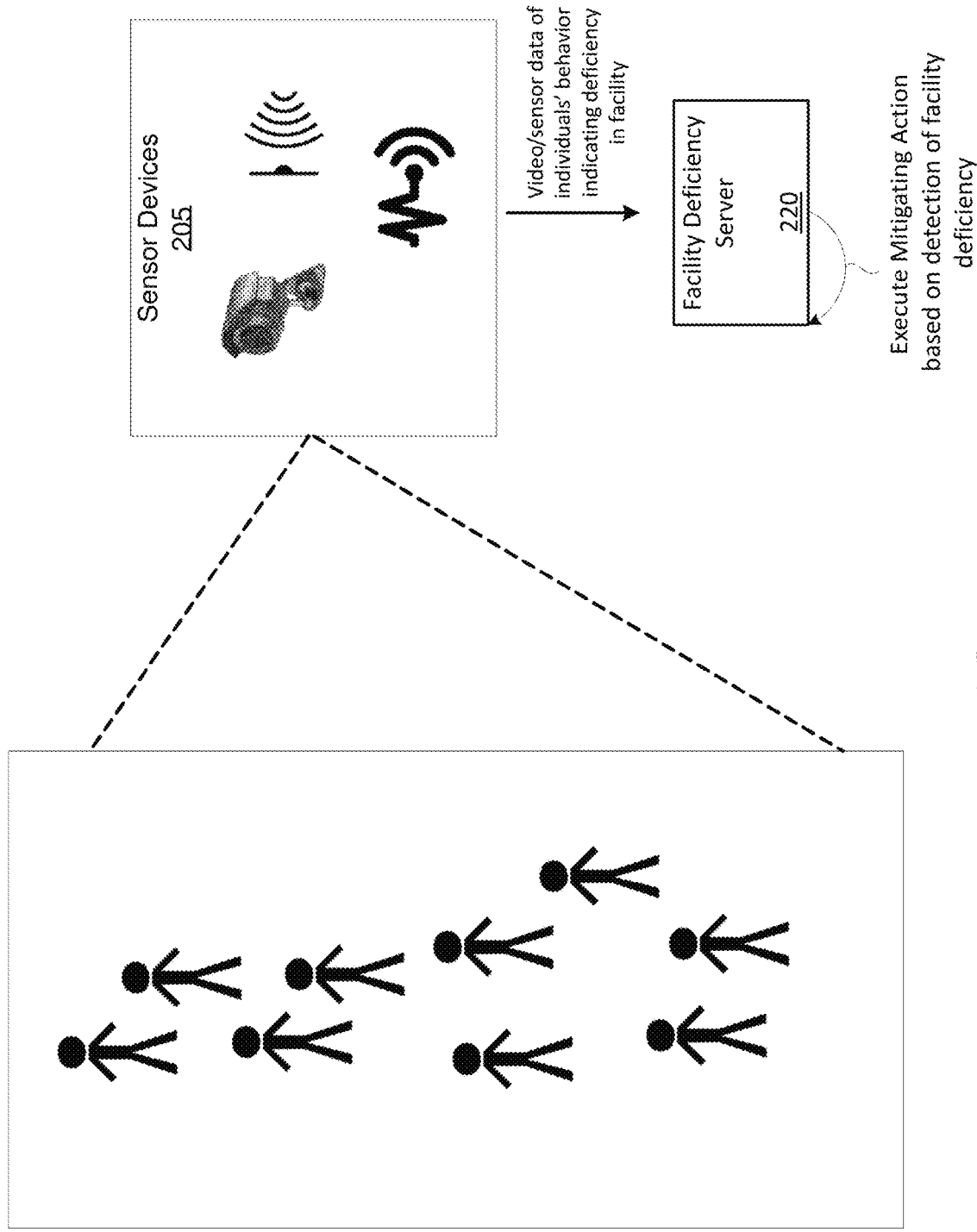
FIG. 4 shows an overview of an example implementation in accordance with aspects of the present invention.

FIG. 4 shows an overview of an example implementation in accordance with aspects of the present invention. As shown in FIG. 4, sensor devices 205 gather sensor data indicating the behavior of individuals in the as the individuals traverse through facilities in an urban, suburban, or rural environment (e.g., public facilities, such as streets, sidewalks, stairs, etc.). As used herein, the term "sensor data" includes video and/or image data, biometrics data of individuals, object detection data, object motion data, etc.

The sensor devices 205 provide a live feed of sensor data indicating whether a deficiency exists in a facility (e.g., a pothole in a street/sidewalk, the presence of other hazards, an unaccommodating facility configuration/layout, such as a lack of accessibility structures, insufficient pedestrian crossing times, hazardous placement of stairs, etc.). The facility deficiency server 220 continuously receives and monitors the live sensor data to detect the facility deficiency. For example, as described herein, the facility deficiency server 220 detects abnormalities in the behavior of individuals from the live sensor data in which the abnormalities indicate a possible deficiency in the facility. In embodiments, the facility deficiency server 220 detects the abnormalities by comparing the sensor data with training data in which the training data indicates sensor datasets that are considered to be "normal" with consideration to multiple different dimensions (e.g., space, time, weather, climate, special needs factors, etc.).

When the live sensor data deviates from the training data to a threshold degree, the facility deficiency server 220 determines that the facility (at the location where the deviation as detected) is deficient. The facility deficiency server 220 determines the details and type of deficiency, the degree/severity of the deficiency, and executes a corresponding mitigating action (e.g., providing a report to authorities responsible for the maintenance/repair of the facility, controlling the operations of facility devices, such as traffic lights, displaying warning messages on nearby electronic billboards and/or user devices, etc.). In this way, the sensor devices 205 and the facility deficiency server 220 provide early detection of facility deficiency without the need for human inspectors, thus improving the response time for detecting and repairing facilities. In turn, public safety and vehicle/pedestrian traffic flow is improved.

Figure 5:
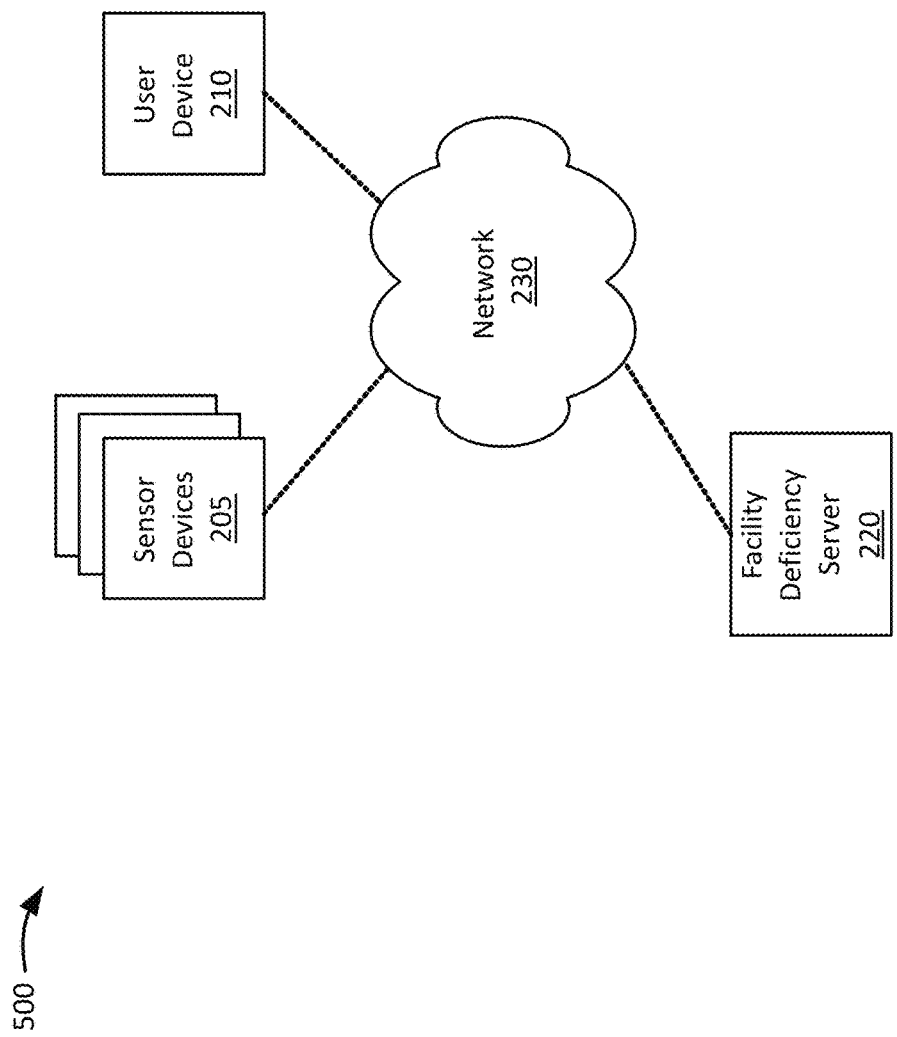
FIG. 5 shows an example environment in accordance with aspects of the present invention.

FIG. 5 shows an example environment in accordance with aspects of the present invention. As shown in FIG. 5, environment 500 includes sensor devices 205, user device 210, facility deficiency server 220, and a network 230. In embodiments, one or more components in environment 500 may correspond to one or more components in the cloud computing environment of FIG. 2. In embodiments, one or more components in environment 500 may include the components of computer system/server 12 of FIG. 1.

The sensor devices 205 includes camera devices, object detection sensors, object motion sensors, climate/temperature sensors, audio sensors, etc. In embodiments, the sensor devices 205 are implemented as traffic cameras, street-side cameras/sensors, on the exterior or interior of buildings, etc. Additionally, or alternatively, the sensor devices 205 include biometrics sensors implemented within a user device 210. In embodiments, the sensor devices 205 provide live sensor data to the facility deficiency server 220 as individuals traverse through facilities in an urban, suburban, or rural environment (e.g., public facilities, such as streets, sidewalks, stairs, etc.).

The user device 210 includes a computing device capable of communicating via a network, such as the network 230. In example embodiments, the user device 210 corresponds to a mobile communication device (e.g., a smart phone or a personal digital assistant (PDA)), a portable computer device (e.g., a laptop or a tablet computer, a wearable computing device), a desktop computer, and/or another type of computing device. In some embodiments, the user device 210 receives notifications/warnings regarding a facility deficiency. Additionally, or alternatively, the user device 210 includes one or more sensor devices 205 (e.g., biometrics sensors) and provides sensor data to the facility deficiency server 220.

The facility deficiency server 220 includes one or more computing devices (e.g., such as computer system/server 12 of FIG. 1) that monitors live sensor data received from the sensor devices 205 to detect a deficiency in a facility. In embodiments, the facility deficiency server 220 is preconfigured with training data indicating sensor datasets that are considered as "normal" user behavior and movements. Additionally, or alternatively, the facility deficiency server 220 implements a training and/or machine learning process in which sensor data over a period of time is stored and trained as "normal" behavior and movements (e.g., normal behavior of individuals and/or objects). In embodiments, the facility deficiency server 220 detects a deficiency in a facility by detecting a deviation between live sensor data and trained data. The facility deficiency server 220 determines the type of deficiency (e.g., obstacle present in facility, damaged facility, hazard present in facility, unaccommodating facility layout, hazardous facility layout, etc.). Additionally, or alternatively, the facility deficiency server 220 determines attributes of individuals for which the facility is deficient. For example, the facility deficiency server 220 determines that facility is deficient among a first group of individuals or individuals with a specific type of impairment. The facility deficiency server 220 performs a mitigating action based on detecting the deficiency and the type of deficiency (e.g., providing a report to authorities responsible for the maintenance/repair of the facility, controlling the operations of facility devices, such as traffic lights, displaying warning messages on nearby electronic billboards and/or user devices, etc.).

The network 230 may include network nodes, such as network nodes 10 of FIG. 2. Additionally, or alternatively, the network 230 may include one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in the environment 500 is not limited to what is shown in FIG. 5. In practice, the environment 500 may include additional devices and/or networks; fewer devices and/or networks; different devices and/or networks; or differently arranged devices and/or networks than illustrated in FIG. 5. Also, in some implementations, one or more of the devices of the environment 500 may perform one or more functions described as being performed by another one or more of the devices of the environment 500. Devices of the environment 500 may interconnect via wired connections, wireless connections, or a combination of wired and wireless connections.

Figure 6:
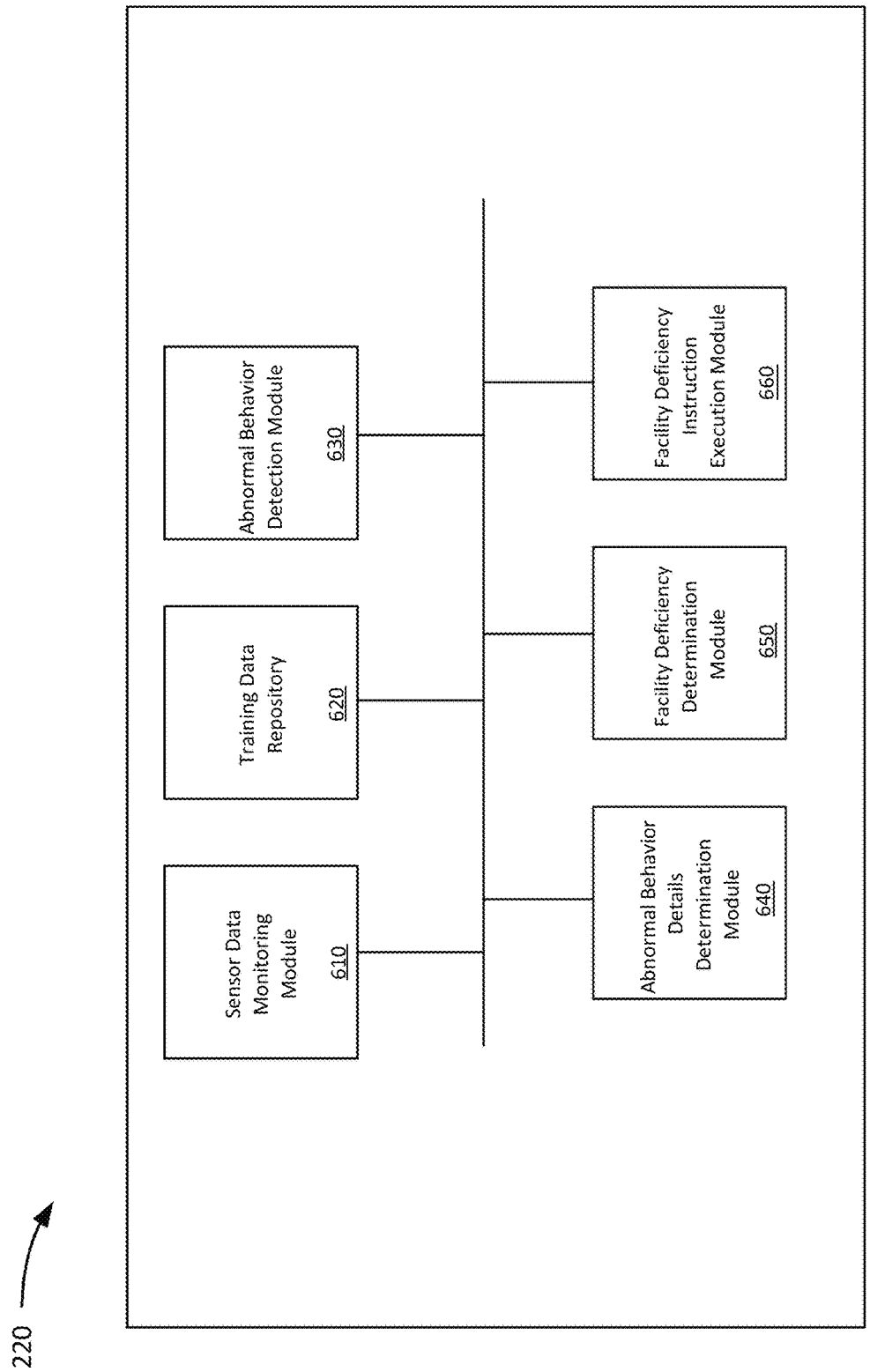
FIG. 6 shows a block diagram of example components of a facility deficiency, in accordance with aspects of the present invention.

FIG. 6 shows a block diagram of example components of a facility deficiency server 220 in accordance with aspects of the present invention. As shown in FIG. 6, the facility deficiency server 220 includes a sensor data monitoring module 610, a training data repository 620, an abnormal behavior detection module 630, a abnormal behavior details determination module 640, a facility deficiency determination module 650, and a facility deficiency instruction execution module 660. In embodiments, the facility deficiency server 220 may include additional or fewer components than those shown in FIG. 6. In embodiments, separate components may be integrated into a single computing component or module. Additionally, or alternatively, a single component may be implemented as multiple computing components or modules.

In embodiments, the sensor data monitoring module 610 includes a program module (e.g., program module 42 of FIG. 1) that receives and monitors sensor data from the sensor devices 205. In embodiments, the sensor data monitoring module 610 receives and monitors the sensor data as part of a training process to "learn" what sensor data corresponds to "normal" user behavior indicating facilities that are in working order and adequate. Also, the sensor data monitoring module 610 receives and monitors live sensor data to detect deficiencies in facilities as is described herein. In embodiments, the sensor data includes data with respect to multiple different dimensions (e.g., walking speed of an individual, spatial dimensions of the individuals walking path/trajectory, time, weather, climate, special needs factors of the individual, the individual's personal information such as age, the individual's biometrics/distress levels, user facility ratings, etc.).

In embodiments, the training data repository 620 includes a data storage device (e.g., storage system 34 of FIG. 1) that maintains datasets of sensor data that is considered to reflect "normal" user behavior around facilities. For example, the training data repository 620 stores datasets that indicate "normal" user behavior associated with facilities that are in working order, such as movement patterns in spatial dimensions, walking speed, biometrics, mood/distress levels, etc. In embodiments, the training dataset is preconfigured and stored based on a prior training process. Additionally, or alternatively, the training dataset is built over a period of time using machine learning techniques, and stored, maintained, and updated in the training data repository 620.

In embodiments, the abnormal behavior detection module 630 includes a program module (e.g., program module 42 of FIG. 1) that detects abnormal behavior in an individual or group of individuals based on live sensor data received and monitored by the sensor data monitoring module 610. In embodiments, the abnormal behavior detection module 630 detects that the live sensor data with respect to a set of dimensions deviates a threshold degree from the training data with the same set of dimensions. As an example, the abnormal behavior detection module 630 detects that, based on live sensor data, a group of individuals' movement speed, movement trajectory, and distress levels deviate from the training data.

In embodiments, the abnormal behavior details determination module 640 includes a program module (e.g., program module 42 of FIG. 1) that receives (e.g., from the abnormal behavior details determination module 640) an indication that abnormal behavior has been detected and determines the details of the abnormal behavior. For example, the abnormal behavior details determination module 640 determines information about the individuals associated with the abnormal behavior (e.g., if the individuals had a trait in common, such as impairment status, age group, etc.). Additionally, or alternatively, the abnormal behavior details determination module 640 performs a difference analysis to determine the differences between the detected abnormal behavior and the training dataset defining normal behavior. For example, the abnormal behavior details determination module 640 determines spatial difference, crowd features difference, differences in other dimensions such as date/time, or weather. As described herein, in embodiments, the spatial differences include overall movement speed, body movements, walking path, etc. In embodiments, the crowd features differences includes negative feedback provided by certain users crossing a crosswalk, differences in biometrics readings/heart rate, etc.

In embodiments, from the difference analysis and the details regarding the abnormal behavior, the abnormal behavior details determination module 640 determines the type of abnormal behavior (e.g., if the abnormal behavior was related to excess movement speed, sudden sharp turns, distress level of a group of individuals, biometrics readings of a group of individuals, etc.). As described herein, the details regarding the abnormal behavior are used to determine the type of facility deficiency and reason behind the deficiency, and appropriate mitigating or corrective actions.

In embodiments, the facility deficiency determination module 650 includes a program module (e.g., program module 42 of FIG. 1) that determines that a facility is deficient based on the detection of abnormal behavior (e.g., as detected by the abnormal behavior detection module 630) and the details of the abnormal behavior (e.g., as determined by the abnormal behavior details determination module 640). In embodiments, the facility deficiency determination module 650 determines the type of facility deficiency (e.g., the presence of other hazards, an unaccommodating facility configuration/layout, such as a lack of accessibility structures, insufficient pedestrian crossing times, hazardous placement of stairs, etc.). As an example, the facility deficiency determination module 650 determines that a facility is present with a hazard (e.g., a pothole in a crosswalk) based on the details of the abnormal behavior indicating that the movement speed of individuals at the location of the hazard slows down and/or that individuals suddenly alter their trajectory to avoid the hazard. As another example, the facility deficiency determination module 650 determines that the facility provides insufficient pedestrian crossing time duration at a crosswalk when individuals consistently increase their movement speed when traversing the crosswalk. As another example, the facility deficiency determination module 650 determines that the facility's layout is unaccommodating to a first group of individuals and/or the physically impaired based on abnormal behaviors arising from only these individuals. In embodiments, the facility deficiency determination module 650 provides an indication to the facility deficiency instruction execution module 660 that the facility is deficient and the type of deficiency.

In embodiments, the facility deficiency determination module 650 implements any suitable data pruning/filtering technique to filter out outliers from the sensor data to determine that certain abnormal behavior is from outlier data and does not indicate a facility deficiency. In this situation, the facility deficiency determination module 650 does not provide an indication to the facility deficiency instruction execution module 660 that the facility is deficient.

In embodiments, the facility deficiency instruction execution module 660 includes a program module (e.g., program module 42 of FIG. 1) that executes an instruction in connection with mitigating a facility deficiency. For example, in embodiments, the facility deficiency instruction execution module 660 executes an instruction to generate a report of the deficiency to relevant officials responsible for maintaining and/or repairing the facilities. Additionally, or alternatively, the facility deficiency instruction execution module 660 executes an instruction to controls the operations of the facility based on the deficiency (e.g., by adjusting the operations of a traffic light to give an additional amount of time to pedestrians to cross a crosswalk). Additionally, or alternatively, the facility deficiency instruction execution module 660 executes an instruction to provide alerts regarding the deficiency to nearby individuals via their user devices 210 (e.g., to warn the individuals of the deficiency, such as a pothole or other potential tripping hazard). Additionally, or alternatively, the facility deficiency instruction execution module 660 executes an instruction to provide alerts regarding the deficiency to nearby individuals of only those individuals who meet certain criteria (e.g., have physical impairments and more likely to be affected by the deficiency). Additionally, or alternatively, the facility deficiency instruction execution module 660 executes an instruction to control the operations of an electronic billboard by posting warnings about the deficiency on the electronic billboard (e.g., to warn surrounding individuals of the deficiency). In embodiments, the instruction to execute is selected from multiple options and is selected based on the type of deficiency associated with the facility.

Figure 7:
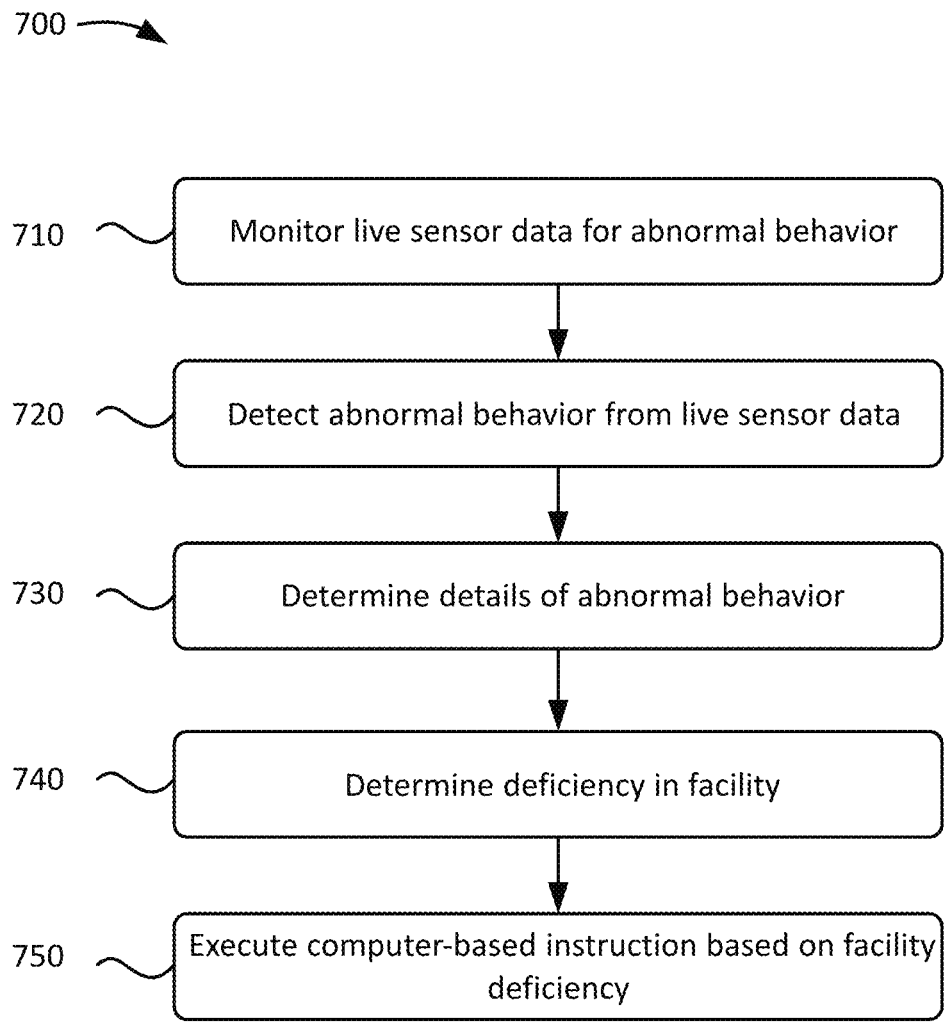
FIG. 7 shows an example flowchart of a process for detecting a facility deficiency and performing a corresponding action to mitigate the deficiency, in accordance with aspects of the present invention.

FIG. 7 shows an example flowchart of a process for detecting a facility deficiency and performing a corresponding action to mitigate the deficiency. The steps of FIG. 7 may be implemented in the environment of FIG. 5, for example, and are described using reference numbers of elements depicted in FIG. 5. As noted above, the flowchart illustrates the architecture, functionality, and operation of possible implementations of systems, methods, and computer program products according to various embodiments of the present invention.

As shown in FIG. 7, process 700 includes monitoring live sensor data for abnormal behavior (step 710). For example, as described above with respect to the sensor data monitoring module 610, the facility deficiency server 220 receives and monitors live sensor data to detect deficiencies in facilities as is described herein. In embodiments, the sensor data includes data with respect to multiple different dimensions (e.g., walking speed of an individual, spatial dimensions of the individuals walking path/trajectory, time, weather, climate, special needs factors of the individual, the individual's personal information such as age, the individual's biometrics/distress levels, etc.).

Process 700 also includes detecting abnormal behavior from the live sensor data (step 720). For example, as described above with respect to the training data repository 620 and the abnormal behavior detection module 630, the facility deficiency server 220 detects that the live sensor data with respect to a set of dimensions (e.g., as received at step 710) deviates a threshold degree from the training data with the same set of dimensions. The deviation of the live sensor data from the training data indicates abnormal behavior (e.g., of an individual, group of individuals, and/or object, such as a car or other vehicle). In other words, the facility deficiency server 220 detects that the real-time behavior from monitoring live sensor data (e.g., at step 710) is considered abnormal when the real-time behavior deviates from the training data.

Process 700 further includes determining details of the abnormal behavior (step 730). For example, as described above with respect to the abnormal behavior details determination module 640, the facility deficiency server 220 determines information about the individuals or objects associated with the abnormal behavior (e.g., if the individuals had a trait in common, such as impairment status, age group, etc.). Additionally, or alternatively, the facility deficiency server 220 performs a difference analysis to determine the difference between the abnormal behavior data and training data defining normal behavior. From the difference analysis, the facility deficiency server 220 determines the type of abnormal behavior (e.g., if the abnormal behavior was related to excess movement speed, sudden sharp turns, distress level of a group of individuals, biometrics readings of a group of individuals, etc.). Also, in embodiments, the facility deficiency server 220 determines the location of the abnormal behavior (e.g., based on distance analysis between the sensor devices 205 used to detect the abnormal behavior and where the abnormal behavior occurs).

Process 700 also includes determining a deficiency in the facility (step 740). For example, as described above with respect to the facility deficiency determination module 650, the facility deficiency server 220 determine that a facility is deficient based on the detection of abnormal behavior (e.g., as detected at step 720) and the details of the abnormal behavior (e.g., as determined at step 730). In embodiments, the facility deficiency server 220 determines the type of facility deficiency and/or the reason for the deficiency (e.g., the presence of other hazards, an unaccommodating facility configuration/layout, such as a lack of accessibility structures, insufficient pedestrian crossing times, hazardous placement of stairs, etc.). Additionally, or alternatively, the facility deficiency server 220 determines the location of the deficiency based on the location of the abnormal behavior (e.g., determined at step 730).

Process 700 further includes executing a computer-based instruction based on the facility deficiency (step 750). For example, as described above with respect to the facility deficiency instruction execution module 660, the facility deficiency server 220 executes an instruction in connection with mitigating a facility deficiency. For example, in embodiments, the facility deficiency server 220 executes an instruction to generate a report of the deficiency to relevant officials responsible for maintaining and/or repairing the facilities, control the operations of facility devices, such as traffic lights, display warning messages on nearby electronic billboards and/or user devices, etc. In this way, the facility deficiency server 220 provides early detection of facility deficiency without the need for human inspectors, thus improving the response time for detecting and repairing facilities. In turn, public safety and vehicle/pedestrian traffic flow is improved.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
monitoring, by a computing device, live sensor data received from one or more sensor devices;
detecting, by the computing device, abnormal behavior of one or more pedestrians based on the monitoring the live sensor data;
determining details of the abnormal behavior, wherein the determining the details of the abnormal behavior comprises receiving feedback from one or more of the one or more pedestrians;
determining, by the computing device, a deficiency of a facility based on both the detecting the abnormal behavior and the determining the details of the abnormal behavior; and
executing, by the computing device, a computer-based instruction based on the deficiency of the facility.

2. The computer-implemented method of claim 1, wherein the detecting the abnormal behavior comprises detecting that the live sensor data deviates a threshold degree from training data that defines normal behavior.

3. The computer-implemented method of claim 2, wherein the training data is preconfigured or learned over a period of time via machine learning.

4. The computer-implemented method of claim 2, wherein the sensor data and the training data are each associated with a plurality of dimensions comprising at least one selected from the group consisting of:
spatial dimensions,
time,
weather,
climate,
special needs factors of the one or more pedestrians,
biometrics data of the one or more pedestrians,
distress levels of the one or more pedestrians,
user facility ratings, and
personal information of the one or more pedestrians.

5. The computer-implemented method of claim 1, wherein the facility includes at least one selected from the group consisting of:
a crosswalk,
a manhole cover,
a bus station,
a sidewalk, and
a staircase.

6. The computer-implemented method of claim 1, wherein the computer-based instruction comprises at least one selected from the group consisting of:
providing a report regarding the deficiency,
providing an alert to user devices regarding the deficiency,
controlling the operations of an electronic billboard to display a warning regarding the deficiency, and
controlling the operations of a pedestrian crossing system.

7. The computer-implemented method of claim 1, further comprising determining a type of the deficiency, wherein the computer-based instruction is based on the type of deficiency.

8. The computer-implemented method of claim 7, wherein the type of deficiency comprises at least one selected from the group consisting of:
a design flaw in the deficiency indicating that the deficiency is inconvenient or unaccommodating, and
damage to the facility.

9. The computer-implemented method of claim 1, wherein a service provider at least one of creates, maintains, deploys and supports the computing device.

10. The computer-implemented method of claim 1, wherein the monitoring the live sensor data, the detecting the abnormal behavior, the determining the deficiency, and the executing the computer-based instruction are provided by a service provider on a subscription, advertising, and/or fee basis.

11. The computer-implemented method of claim 1, wherein the computing device includes software provided as a service in a cloud environment.

12. The computer-implemented method of claim 1, further comprising deploying a system, wherein the deploying the system comprises providing a computer infrastructure operable to perform the monitoring the live sensor data, the detecting the abnormal behavior, the determining the deficiency, and the executing the computer-based instruction.

13. The computer-implemented method of claim 1, wherein the deficiency comprises an obstacle that causes the one or more pedestrians to walk in a manner that exhibits the abnormal behavior.

14. A computer program product comprising a computer readable storage medium having program instructions embodied therewith, the program instructions executable by a computing device to cause the computing device to:
monitor live video data of a plurality of individuals walking in a public facility;
detect abnormal behavior of the plurality of individuals based on the monitoring the live video data;
determine a deficiency of a facility based on the detecting the abnormal behavior, wherein the deficiency comprises an obstacle that causes the individuals to walk in a manner that exhibits the abnormal behavior; and
perform a mitigating action based on the deficiency of the facility.

15. The computer program product of claim 14, wherein the program instructions further cause the computing device to determine details of the abnormal behavior, wherein:
the details comprise at least one from the group consisting of:
a difference between the live video data and training data that defines normal behavior, and
common traits between the one or more individuals, and
the determining the deficiency is based on the details of the abnormal behavior.

16. The computer program product of claim 14, wherein the detecting the abnormal behavior comprises detecting that the live sensor data deviates a threshold degree from training data that defines normal behavior.

17. The computer program product of claim 14, wherein the mitigating action comprises at least one selected from the group consisting of:
providing a report regarding the deficiency,
providing an alert to user devices regarding the deficiency, controlling the operations of an electronic billboard to display a warning regarding the deficiency, and controlling the operations of a traffic light or pedestrian crossing system.

18. The computer program product of claim 14, wherein the program instructions further cause the computing device to determine a type of the deficiency, wherein the mitigating action is based on the type of deficiency.

19. A system comprising:

a processor, a computer readable memory and a computer readable storage medium associated with a computing device;

program instructions to detect a real-time behavior of a plurality of pedestrians from monitoring video data in real-time;

program instructions to detect that the real-time behavior of the plurality of pedestrians at a particular location of a sidewalk deviates from training data defining normal behavior;

program instructions to determine that the real-time behavior is abnormal based on the detecting that the real-time behavior deviates from the training data;

program instructions to determine a deficiency of the sidewalk at the particular location based on determining that the real-time behavior is abnormal, wherein the deficiency comprises an obstacle in the sidewalk that causes the plurality of pedestrians to walk in a manner that exhibits the abnormal behavior; and program instructions to execute a computer-based instruction based on the determining the deficiency, wherein the program instructions are stored on the computer readable storage medium for execution by the processor via the computer readable memory.

20. The system of claim 19, wherein the computer-based instruction comprises at least one selected from the group consisting of:

providing a report regarding the deficiency, providing an alert to user devices regarding the deficiency, and controlling the operations of an electronic billboard to display a warning regarding the deficiency.

* * * * *